United States Patent
Cacace

(10) Patent No.: US 8,087,873 B2
(45) Date of Patent: Jan. 3, 2012

(54) SECONDARY BLADE PORTION CONTAINMENT DEVICE

(75) Inventor: Anthony Cacace, Haddam, CT (US)

(73) Assignee: GKN Aerospace Services Structures, Corp., Cromwell, CT (US)

( * ) Notice: Subject to any disclaimer, the term of this patent is extended or adjusted under 35 U.S.C. 154(b) by 675 days.

(21) Appl. No.: 12/246,091

(22) Filed: Oct. 6, 2008

(65) Prior Publication Data

US 2009/0175714 A1    Jul. 9, 2009

Related U.S. Application Data

(60) Provisional application No. 60/960,573, filed on Oct. 4, 2007.

(51) Int. Cl.
*F01B 25/16*    (2006.01)
(52) U.S. Cl. ............................................. 415/9
(58) Field of Classification Search ............. 415/9, 200, 415/196, 201; 428/105, 902, 911
See application file for complete search history.

(56) References Cited

U.S. PATENT DOCUMENTS

| | | | | |
|---|---|---|---|---|
| 2,999,667 | A | * | 9/1961 | Morley .......................... 415/196 |
| 5,437,538 | A | * | 8/1995 | Mitchell ........................... 415/9 |
| 6,053,696 | A | * | 4/2000 | Roberts .............................. 415/9 |

* cited by examiner

*Primary Examiner* — Alexander Gilman
(74) *Attorney, Agent, or Firm* — Quarles & Brady LLP

(57) ABSTRACT

A device that deploys during a blade portion failure that encompasses the engine casing is provided to prevent damage caused by the failure. A blade containment device such as a flexible interwoven structure or a net encompasses the engine casing and the blade failure path, or is embedded in the engine casing, and deploys in the event of a blade failure, such as the breaking of an engine blade. The net deploys when the blade portion has failed and has started expanding along the blade failure path, and may include a number of links attached to one another. Upon impact with a broken blade portion, thus transferring the kinetic energy of the blade portion to the net, some or all of the links may break off from each other, thus allowing the net to deploy and dissipating the kinetic energy generated by the expanding broken blade. Consequently, the blade remains contained inside the net, and blade containment is improved.

21 Claims, 4 Drawing Sheets

SECONDARY BLADE PORTION CONTAINMENT DEVICE

This application claims priority from provisional application No. 60/960,573, filed on Oct. 4, 2007 in the U.S. Patent Office and titled "Secondary Blade Portion Containment Device," and which is incorporated by reference herein in its entirety.

BACKGROUND OF THE INVENTION

1. Field of the Invention

Aspects of the present invention relates to an engine or fan blade portion containment device, and in particular to a device that deploys during an engine or fan blade failure by capturing the failed blade in a secondary retention system on the outer structure of the engine or fan casing.

2. Background of the Related Art

There is a general need in the art for blade containment useful, for example, in an engine or fan blade failure condition in, for example, a jet engine or a propeller. During an engine or fan blade failure, also referred to as blade out, the blade can acquire a very high kinetic energy because of its high speed rotation inside the engine casing, and thus can severely damage aircraft parts, such as hydraulics of pneumatic lines, or cause other aircraft damage, when the blade breaks off. Although blade outs are typically rare, their damage, especially on an aircraft that is flying at high altitude over, for example, the ocean, can be severe in terms of equipment damage and passenger safety. Among other damages, the blade can cause injury to the passengers of an aircraft if it penetrates the fuselage upon escaping from the engine.

Conventional configurations typically include designing the fan or engine casing from a heavy material, such as high strength steel, Kevlar, or the like, in order to contain the blade during failure. However, these techniques generally add significant weight to the aircraft, and thus increase energy consumption and associated costs.

There remains a need for a device that provides containment of a broken blade portion during a blade out that is relatively light weight and that may be relatively inexpensive compared to related art devices.

SUMMARY OF THE INVENTION

During a blade out, severe damage can occur to an aircraft, such as loss of control of the aircraft or structural damage. A broken blade portion can cause injury to the passengers of an aircraft if it penetrates the fuselage, and can also cause engine failure. According to various exemplary aspects of the current invention, a flexible interwoven structure such as a mesh or a net that deploys during an engine or fan blade out is provided. The device may encompass all or part of the engine casing.

According to an exemplary aspect of the current invention, a blade containment encompasses the engine casing and the blade failure path. The blade containment net may encompass areas around the engine casing in directions in which the blade portion could escape when the blade out occurs. In order to reduce space occupancy, the blade containment net may be collapsed on the surface of the engine casing during normal operation of the engine, and may only be deployed in the event of a blade out. According to various aspects of the current invention, the blade containment net may be embedded in the engine casing. Structurally, the net may be made out of any material that provides high tensile strength and low brittleness, such as a metal (e.g., a steel or other metal woven wire), as well as a composite, carbon fiber, Kevlar, or a ceramic. Other materials that provide high tensile strength and low brittleness may also compose all or portions of the net.

According to another aspect of the current invention, the net may be compressible so as to fit around the engine casing or nacelle and reduce space occupancy, or to be embedded in the engine casing, and various portions of the net may be attached to each other via attachment features such as tying, at various points of the net, in order to provide an amount of expansion resistance upon impact with a broken blade portion. Accordingly, the net deploys when the blade portion has failed, has broken, or has otherwise started expanding along the blade failure path, which may include penetrating through the engine casing. Alternatively, portions of the net may selectively deploy only when the broken blade impacts that portion of the net with sufficient kinetic energy, which may be a kinetic energy that is greater than a threshold energy for that portion. According to various aspects of the current invention, the net may include a number of links attached to one another. Upon impact with a broken blade portion, some or all of the links may break off from each other as a result of the transfer of the kinetic energy of the broken blade portion from the blade portion to the net.

The energy imparted to the net and to the links of the net from the impact with the broken blade may thereby be converted from kinetic energy to dissipated energy in the net, and thus dissipated and dispersed throughout the net. According to various aspects of the current invention, the kinetic energy of the broken blade portion may be dissipated in the form of successive breaks of some or all of the links as a consequence of the impact between the net and the broken blade portion. Consequently, the blade may remain contained inside the net, and blade containment thereby improved. It should be noted that although tying is used as an example to describe the attachment of the various portions or links of the blade containment device, any other suitable technique of attachment of the links can be used, such as welding, taping, adhering, tying, bolting, and the like.

According to another aspect of the current invention, the links and various portions of the net that are attached to each other via attachment features, such as tying, may have variable attachment strengths and thus variable failure levels. Different portions of the net, or different links forming the net, may be attached to each other at different strength levels. Accordingly, some links may detach or break off upon impact with the broken blade portion at a first kinetic energy, which is the kinetic energy of the broken blade portion transferred to the net upon impact and converted into energy to produce a break of some of the links, while other links may break off upon impact at a second different kinetic energy. When a broken blade portion contacts the net and transfers its kinetic energy to the net and to the links of the net, the links may not break off from each other at the same time, but may break off variably because different links of the net may be attached to each other at different strength levels. For example, the more weakly attached links may break off first, then links that are attached with a greater strength may break off next, and links with the greatest attachment strength may break off last. As such, links break off successively on the basis of their attachment strength upon contact with the broken blade portion. As a result of this variable attachment and breaking off of the links, the kinetic energy of the broken blade portion is dissipated more efficiently, and the blade is contained more effectively.

Among other advantages of the current invention, the various aspects of the blade containment device described above provide the ability to use a light weight medium, lighter than conventional engine casings, to contain the failed blade portions because of the ability of the net to dissipate the kinetic energy transferred from the broken blade. Another advantage lies in space saving as the net can be collapsed about the engine casing and occupy minimal size during normal operation.

Additional advantages and novel features of the current invention will be set forth in part in the description that follows, and in part will become more apparent to those skilled in the art upon examination of the following or upon learning by practice of the invention.

BRIEF DESCRIPTION OF THE DRAWINGS

Various exemplary aspects of the systems and methods according to the current invention will be described in detail with reference to the following figures, wherein.

DETAILED DESCRIPTION

These and other features and advantages of this invention are described in, or are apparent from the following detailed description and figures for various exemplary aspects of a blade containment device according to the current invention.

Figure 1:
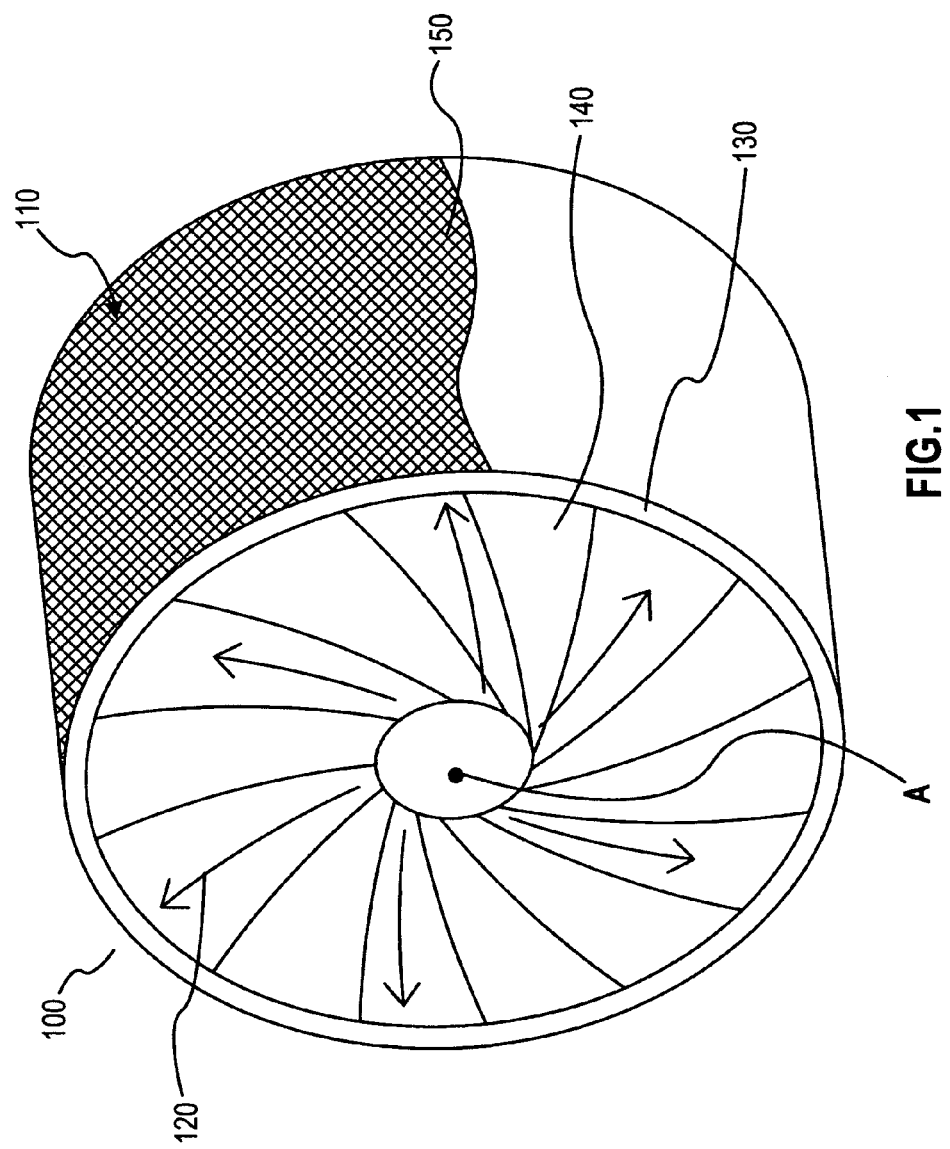
FIG. 1 is a perspective view of a blade containment device according to an exemplary aspect of the current invention.

FIG. 1 is a perspective representative view of a blade containment device 100 that may encompass the nacelle or engine casing 130 of an airplane, according to an exemplary aspect of the current invention. In FIG. 1, the engine casing 130 is covered at least partially by the blade containment device which may be a flexible interwoven structure or net 150. According to various aspects of the current invention, the blade containment net 150 may be embedded in the engine casing 130. The blade containment device or net 150 may comprise a net with a mesh pattern 110. The mesh pattern may vary and may be, for example, a circumferential mesh pattern, or an axial mesh pattern. In the event of a blade failure or blade out, the net 150 may deploy outwardly in a radial direction 120 away from the center A of the engine casing 130, in order to contain any blade portion 140 that may break off and be expelled away from the center A during the blade failure. In the exemplary illustration of FIG. 1, the blade containment device or net 150 is collapsed in a static, non-deployed position, around the engine casing 130, and encompasses the engine casing 130. Furthermore, although FIG. 1 depicts the containment device or net 150 being distributed around the engine casing 130 over its entire width, the containment device or net 150 may also be distributed around the engine casing 130 only over a portion of a width of the casing 130, such as over an area of the highest likely damage. The containment net 150 may be secured to the engine casing 130 via any securing device or method, such as welding, bolting, gluing, taping, or tying, may be embedded in the engine casing 130, or may be simply wrapped around the engine casing 130 via, for example, an attachment mechanism such as a belt.

Figure 2A:
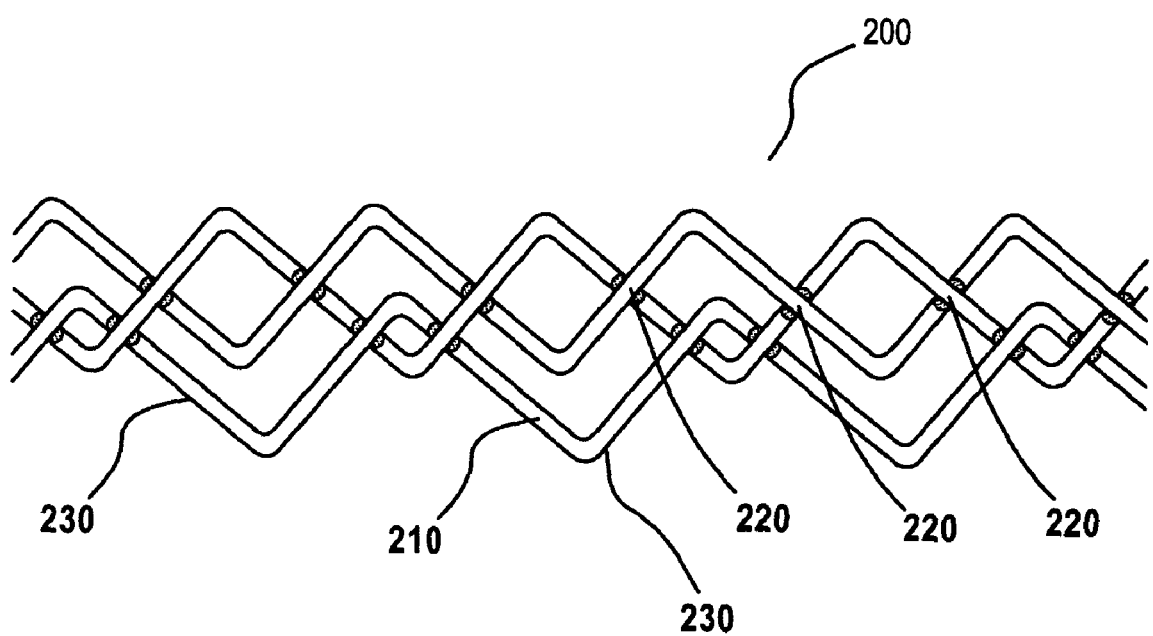
FIGS. 2A-2B are side views of another exemplary aspect of a blade containment device during different stages of blade failure.
Figure 2B:
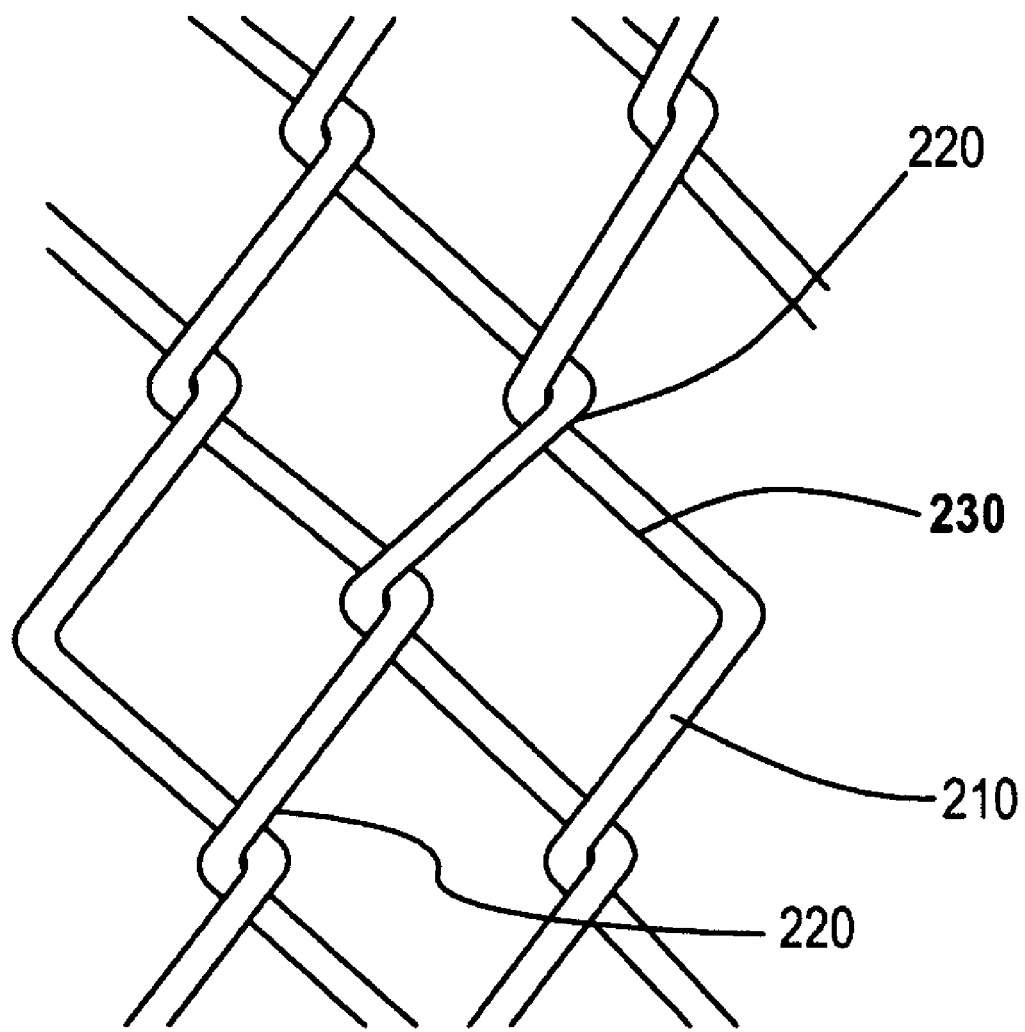

FIGS. 2A-2B are partial side views of an exemplary aspect of a blade containment device 200 during different stages of blade failure. In FIG. 2A, the blade containment device which may be a flexible interwoven structure or net 210 is collapsed in a non-deployed position, such as, for example, the non-deployed position described in FIG. 1. According to various aspects of the current invention, the blade containment net 210 in FIG. 2A may be compactly located around the engine casing, or may be embedded in the engine casing. At various points on the net 210, specifically at various points of the mesh that forms the net 210, various attachment points 220 that attach links 230 of the net 210 together may be provided. These attachment points 220 may attach various links 230 to each other via attachment means such as, for example, by tying. Accordingly, in the absence of a blade failure, the net 210 is collapsed over the engine casing, and the links 230 are attached to each other at the attachment points 220. It should be noted that although the example of tying is used in this description to describe the attachment of various portions of the blade containment device, any other suitable technique of attachment can be used such as taping, adhering, tying, bolting, and the like.

FIG. 2B illustrates the net 210 after deployment occurs due to, and following, a blade out event. During the blade out event, the kinetic energy of the broken blade portion is transferred to some or all the attachment points 220 on impact and is transformed into potential energy, which results in some or all the attachment points 220 breaking off, and allowing the links 230 to separate from each other and expand under the impact of the broken blade portion. Accordingly, the net 210 expands outwardly in a generally radial direction away from the centerline of the engine casing, such as the center A illustrated in FIG. 1, because of the impact of the broken blade portion. It should be noted that although the breaking off of the attachment points 220 is the result of a conversion of the kinetic energy of the broken blade portion to potential energy, once most or all of the links 230 are broken off, any remaining kinetic energy in the broken blade portion is converted into dissipated energy of the net 210, resulting in the radial deployment of the net 210.

According to various aspects of the current invention, the strength of the attachment points 220 may be identical or very similar, but may also differ among different attachment points 220. When the attachment strength of various attachment points 220 varies throughout the net 210, the attachment points 220 may break off selectively, depending on the impact of the broken blade portion and the amount of kinetic energy transferred by the broken blade portion to each attachment point 220 and converted into dissipated energy. Weakly attached points 220 may break off first, then successively stronger attachment points 220 may break off successively. When most or all the attachment points 220 break off, the net 210 deploys outwards in a radial direction because of the impact of the broken blade portion, which transfers its kinetic energy to the net and is converted to dissipated energy via the net 210, thus deploying the net 210. When the net 210 deploys, the blade portion escaping the engine casing during failure is captured and contained.

Figure 3A:
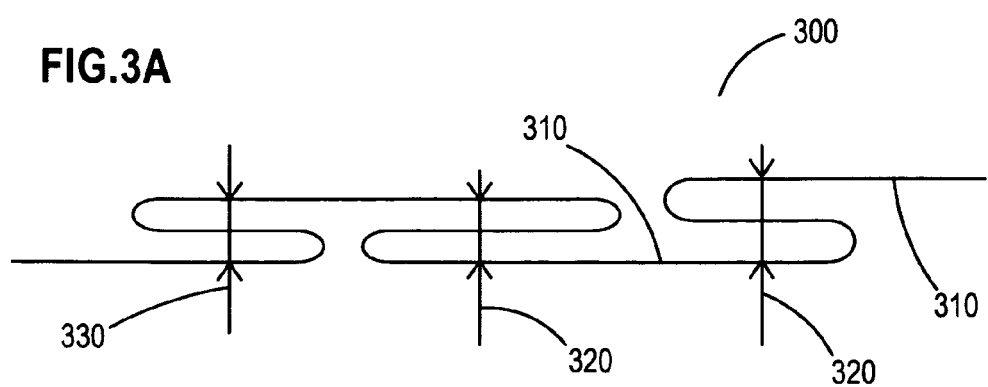
FIGS. 3A-3C are illustrations of an exemplary aspect of blade containment occurring during a blade failure.
Figure 3B:
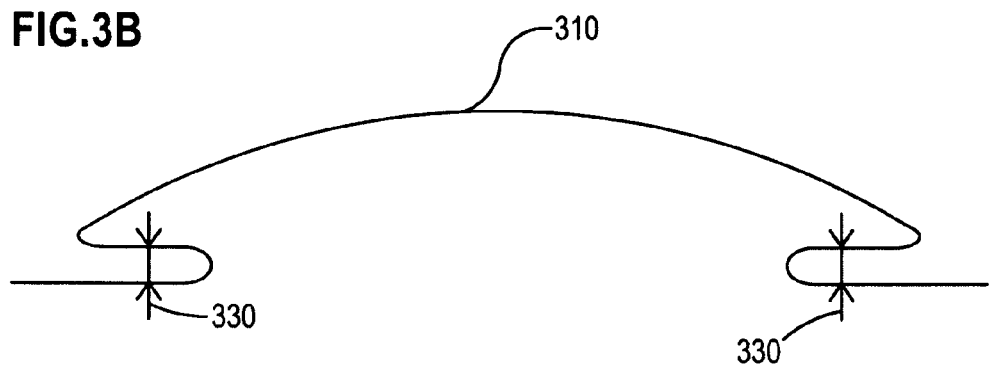
Figure 3C:
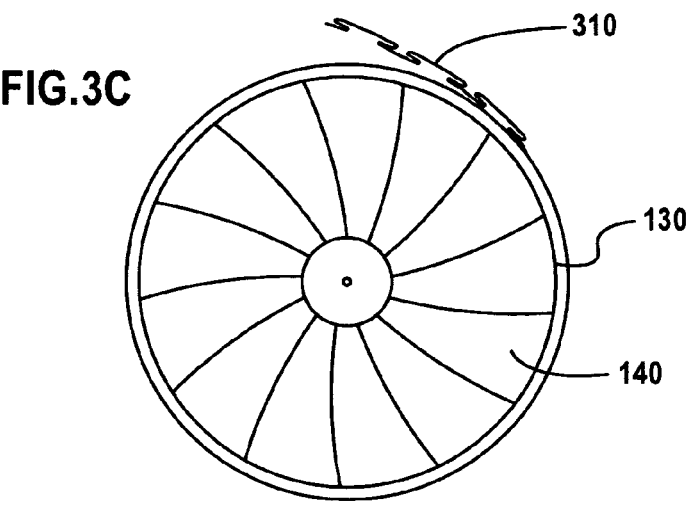

FIGS. 3A-3C are representative illustrations of blade containment occurring during a blade out event, in accordance with another aspect of the present invention. In FIG. 3A, the net 310 is in a collapsed position during normal operation of the engine, and various points 320 and 330 of the net are attached together via attachment features such as welding, taping, adhering, tying, bolting, and the like. According to various aspects of the current invention, the attachment points 320 and 330 may have different attachment strengths. In other words, attachment point 330 may require a greater kinetic energy transferred from the broken blade portion than attachment point 320 in order to break off and allow the net 310 to deploy and achieve containment of the broken blade portion. It should be noted that although only two types of attachment points 320 and 330, having two differing attachment strengths, are illustrated in FIGS. 3A and 3B, the net 310 may include a plurality of other types of attachment points with varying attachment strengths that break off upon being impacted by the broken blade portion at different kinetic energies transferred by the broken blade portion. It should be noted that various attachments points on the net 310 may have various attachment strengths.

As a result of varying attachment strengths of the attachment points on the net 310, a sequential breaking of those attachment points, and a resulting and subsequent deployment of the containment net 310, can be achieved as a broken blade portion impacts the net 310. In the exemplary illustration of FIG. 3A, the attachment points 320 and 330 are illustrated as lengths of attaching material such as a wire. In the case where the attachment points 320 and 330 include a wire that attaches overlapping portions 330 of the net 310, the attachment points 320 and 330 may include separate lengths of wire binding the overlapping portions 330 of the net 310. According to various aspects of the current invention, the wire binding may include the use of wires of differing thickness and material in order to provide various tensile strengths, resulting in differing strengths of attachment of various net portions. Similarly to the use of wire, other types of attachment or binding, or other materials, may be used.

In FIG. 3B, the net 310 is shown in almost full deployment, such as after a blade out has occurred, and the previous attachment points 320, which were intact prior to the blade out, have broken off due to the imparted kinetic energy of the broken blade portion during the blade out event. However, attachment points 330 are still intact because, in this example, these attachment points 330 have a stronger attachment strength than attachment points 320, and can sustain a higher kinetic energy transferred from the broken blade portion. It should be noted that, in this example, attachment point 330 can also separate if the remaining kinetic energy of the broken blade portion transferred to the attachment point 330 during the blade out event is sufficiently high.

The sequential separation of the attachment points 320 and 330 throughout the net 310 allows an improved dispersion and dissipation of the kinetic energy of the broken blade portion during a blade out event. The sequential separation of the attachment points 320 and 330, and subsequent deployment of the net 310, results in the containment of the broken blade portion. It should be noted that the net illustrated in FIG. 3B is in a semi-deployed position since some of the attachment points 330 remain unbroken. When all of the attachment points are broken off, then the net is fully deployed.

FIG. 3C is a side view of the net in relation to an engine casing and an engine in a semi-deployed position. It should be noted that although two types of attachment strengths are illustrated in FIGS. 3A-3C, a larger number of attachment points with different attachment strengths may be provided on various areas of the net 310, thus providing a sequential breaking off of the attachment points and a sequential deployment of the net 310, which dissipates the kinetic energy of the broken blade portion during a blade out event more efficiently.

While aspects of this invention have been described in conjunction with the exemplary aspects outlined above, various alternatives, modifications, variations, improvements, and/or substantial equivalents, whether known or that is or may be presently unforeseen, may become apparent to those having at least ordinary skill in the art. Accordingly, the exemplary aspects of the invention, as set forth above, are intended to be illustrative, not limiting. Various changes may be made without departing from the spirit and scope thereof. Therefore, aspects of the invention are intended to embrace all known or later-developed alternatives, modifications, variations, improvements, and/or substantial equivalents.

What is claimed is:

1. A blade containment device for containing a moving blade of an engine upon failure, the blade containment device comprising:
    a flexible interwoven structure formed from segments, the segments being breakably attached to one another at attachment locations in a non-deployed position of the flexible interwoven structure;
    wherein, upon impact of the flexible interwoven structure, at least some of the attachment locations break, thereby permitting separation of the segments relative to one another and expansion of the flexible interwoven structure.

2. The blade containment device of claim 1, wherein the flexible interwoven structure is annular.

3. The blade containment device of claim 1, wherein, upon deployment of the flexible interwoven structure, the flexible interwoven structure is configured to expand radially as attachment locations break.

4. The blade containment device of claim 1, wherein each of the attachment locations have a corresponding attachment strength and wherein at least some of the attachment strengths are different than others so as to provide for selective breaking of the attachment locations.

5. The blade containment device of claim 4, wherein weaker attachment locations are configured to break prior to stronger attachment locations under an impact force.

6. The blade containment device of claim 1, further comprising an engine casing in which the flexible interwoven structure encompasses at least a portion of the engine casing in the non-deployed position.

7. The blade containment device of claim 6, wherein the flexible interwoven structure is disposed at a radially outward surface of the engine casing.

8. The blade containment device of claim 6, wherein the flexible interwoven structure is embedded in the engine casing.

9. The blade containment device of claim 1, wherein attachment of the segments to one another includes at least one of an attachment selected from the group consisting of welding, gluing, taping, and tying.

10. The blade containment device of claim 1, wherein the flexible interwoven structure is a mesh.

11. The blade containment device of claim 1, wherein the segments are tied via one or more wires.

12. The blade containment device of claim 11, wherein the one or more wires have differing strength, thickness, length, or material.

13. The blade containment device of claim 1, wherein the segments are interwoven such that, even if the attachment locations are broken, the segments remain connected together.

14. A blade containment device for containing a moving blade of an aircraft engine upon failure, the blade containment device comprising:
    a flexible interwoven net in which segments of the net are attached to one another so as to define links, the links including expandable links defined by at least two attachment locations of one segment to another segment, each expandable link having a non-deployed perimeter bounding the area of the link and a deployed perimeter bounding the area of the link in which the deployed perimeter of the link is expanded in comparison to the non-deployed perimeter;

wherein the non-deployed perimeter has attachment locations of the expandable links that are positioned along the segments of the net that define the perimeter of the expandable link so that the breakage of the attachment locations results in slippage of the attachment locations along at least one of the segments and an expansion of the perimeter of the expandable link.

15. The blade containment device of claim 14, wherein the net is wrapped around a space so as to contain a blade moving tangentially away from a central axis of the aircraft engine.

16. The blade containment device of claim 14, wherein each of the attachment locations have a corresponding attachment strength and wherein at least some of the attachment strengths are different than others so as to provide for selective breaking of the attachment locations.

17. The blade containment device of claim 14, further comprising an engine casing in which the flexible interwoven structure encompasses at least a portion of the engine casing in the non-deployed position.

18. The blade containment device of claim 17, wherein the flexible interwoven structure is disposed at a radially outward surface of the engine casing.

19. The blade containment device of claim 18, wherein the flexible interwoven structure is embedded in the engine casing.

20. The blade containment device of claim 14, wherein the expandable links expand upon impact with a blade.

21. The blade containment device of claim 14, wherein the net is annular.

* * * * *